(12) United States Patent
Yang

(10) Patent No.: US 8,305,536 B2
(45) Date of Patent: Nov. 6, 2012

(54) LIQUID CRYSTAL DISPLAY DEVICE AND METHOD FOR FABRICATING THE SAME INCLUDING CONDUCTIVE LAYER PATTERN COVERING DATA LINE AND ACTIVE LAYER WITHIN OPENING OF PASSIVATION LAYER

(75) Inventor: Joon-Young Yang, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1213 days.

(21) Appl. No.: 11/522,328

(22) Filed: Sep. 18, 2006

(65) Prior Publication Data

US 2007/0153151 A1 Jul. 5, 2007

(30) Foreign Application Priority Data

Dec. 30, 2005 (KR) ........................ 10-2005-0136195

(51) Int. Cl.
| G02F 1/136 | (2006.01) |
| G02F 1/1333 | (2006.01) |
| G02F 1/1343 | (2006.01) |
| G02F 1/13 | (2006.01) |
| H01L 21/00 | (2006.01) |
| H01L 29/04 | (2006.01) |
| H01L 29/10 | (2006.01) |
| H01L 31/00 | (2006.01) |
| H01L 27/14 | (2006.01) |
| H01L 29/15 | (2006.01) |
| H01L 31/036 | (2006.01) |

(52) U.S. Cl. ......... 349/139; 349/43; 349/138; 349/140; 349/141; 349/147; 349/187; 438/30; 257/58; 257/72

(58) Field of Classification Search ................ 349/43, 349/122, 138–142, 147, 187, 192; 257/59, 257/72; 438/30, 609
See application file for complete search history.

(56) References Cited

U.S. PATENT DOCUMENTS

| 5,478,766 | A  | * | 12/1995 | Park et al. ............... 438/158 |
| 6,287,899 | B1 |   | 9/2001  | Park et al. |
| 6,404,475 | B1 | * | 6/2002  | Nakayoshi et al. ....... 349/141 |
| 6,429,057 | B1 | * | 8/2002  | Hong et al. ............... 438/158 |
| 6,900,854 | B1 | * | 5/2005  | Kim et al. ................. 349/43 |
| 7,016,007 | B2 | * | 3/2006  | Chang et al. ............. 349/149 |
| 7,436,461 | B2 | * | 10/2008 | Choi et al. ............... 349/42 |
| 2003/0073267 | A1 |   | 4/2003 | Baek et al. |
| 2005/0046771 | A1 |   | 3/2005 | Lee et al. |
| 2006/0049403 | A1 | * | 3/2006 | Byun et al. .............. 257/59 |

FOREIGN PATENT DOCUMENTS

| JP | 2000-206571 A | 7/2000 |
| JP | 2005-70788 A  | 3/2005 |
| KR | 2000-27712 A  | 5/2000 |
| KR | 2004-41491 A  | 5/2004 |

\* cited by examiner

*Primary Examiner* — Mark Robinson
*Assistant Examiner* — Paisley L Arendt
(74) *Attorney, Agent, or Firm* — Birch, Stewart, Kolasch & Birch, LLP

(57) ABSTRACT

A liquid crystal display device and a method for fabricating the same are provided. The method includes forming a gate line and a data line on a first substrate crossing each other to define a pixel region; forming a gate electrode, a source electrode and a drain electrode of a transistor on the first substrate; forming an active layer below the data line and between the gate electrode and each of the source electrode and the drain electrode, wherein the active layer below the data line has an exposed portion exposed by the data line; removing the exposed portion of the active layer below the data line; and forming a pixel electrode connected to the drain electrode.

22 Claims, 11 Drawing Sheets

LIQUID CRYSTAL DISPLAY DEVICE AND METHOD FOR FABRICATING THE SAME INCLUDING CONDUCTIVE LAYER PATTERN COVERING DATA LINE AND ACTIVE LAYER WITHIN OPENING OF PASSIVATION LAYER

This Nonprovisional Application claims priority under 35 U.S.C. §119(a) on Patent Application No. 10-2005-0136195 filed in Korea on Dec. 30, 2005, the entire contents of which are hereby incorporated by reference.

BACKGROUND OF THE INVENTION

1. Field of the Invention

The present invention relates to a liquid crystal display device and a method for fabricating the same. More particularly, the present invention relates to a liquid crystal display device, which can prevent signal distortion by reducing the interference effect between an active layer and a common electrode, as well as a method for fabricating the same.

2. Description of the Related Art

A display device, especially a flat panel display, such as a liquid crystal display (LCD) device, is driven by an active device, such as a thin film transistor (TFT), at each pixel.

This kind of driving method for a display device is usually called an active matrix driving method. In such an active matrix method, the active device is arranged at each pixel in a matrix form to drive the corresponding pixel.

FIG. 1 is a view showing an active matrix type liquid crystal display device. The LCD device is a TFT LCD device in which a thin film transistor is used as an active device.

As shown therein, each pixel of the TFT LCD device where N×M pixels are arranged horizontally and vertically includes a TFT (not shown) formed at the crossing of a gate line 13 to which a scan signal is applied from an external driving circuit and a data line 19 to which an image signal is applied.

The TFT (not shown) includes a gate electrode 13a connected to the gate line 13, an active layer 17 formed on the gate electrode 13a and activated as a scan signal is applied to the gate electrode 13a, and source/drain electrodes 19a and 19b formed on the active layer 17.

A pixel electrode 29 is formed at a display region of the pixel. The pixel electrode 29 is connected to the drain electrode 19b and operates the liquid crystal (not shown) by receiving an image signal through the drain electrode 19b as the active layer 17 is activated.

Such an LCD device is usually manufactured by complicated processes including a photolithography process using a mask. A conventional method for fabricating an LCD device using a four-mask process will be described with reference to FIGS. 2A to 2I.

FIGS. 2A to 2I are sectional views showing a process for fabricating a liquid crystal display device according to the related art, taken along lines IIA-IIA and IIB-IIB of FIG. 1.

Referring to FIG. 2A, a metal layer (not shown) is formed on a first substrate 11 and a first photoresist film (not shown) is coated on the deposited metal layer. Then, a photolithography process including exposure and development processes using a first mask (not shown) is carried out to remove the first photoresist film and form a first photoresist pattern (not shown). Subsequently, the metal layer is selectively removed using the first photoresist pattern as a mask to form a gate line (not shown) and a gate electrode 13a extending from the gate line.

Next, referring to FIG. 2B, after removing the first photoresist pattern, a gate insulating layer 15, an active layer 17, an ohmic contact layer (not shown), and a conductive layer 19 are sequentially formed on the entire surface of the first substrate 11 where the gate electrode 13a is formed.

Subsequently, a second photoresist film 21 is coated on the conductive layer 19, and then the second photoresist pattern 21 is selectively removed through another photolithography process including diffractive exposure and development processes using a second mask 23, which is a diffraction mask, thereby forming second photoresist patterns 21a and 21b. At this time, the second mask 23 serving as the diffraction mask includes a light shielding portion 23a, a semi-transmitting portion 23b, and a transmitting portion 23c. The light shielding portion 23a is disposed at a top portion of the second photoresist film 21 corresponding to the source/drain regions, the semi-transmitting portion 23b is disposed at a position above the second photoresist film 21 corresponding to the channel region, and the transmitting portion 23c is disposed at a top portion of the second photoresist film 21 corresponding to the regions except the above regions.

Therefore, the portion of the second photoresist pattern 21a, patterned by a development process by ultraviolet rays irradiated through the semi-transmitting portion 23b of the second mask 23 serving as the diffraction mask has a photoresist film thickness smaller than the portion of the second photoresist pattern 21b disposed on the upper end of the channel region of the active layer 17. Therefore, although part of the ultraviolet rays is irradiated to the second photoresist film 21 through the semi-transmitting portion 23b, it is not irradiated through the light shielding portion 23a. Accordingly, the portion of the second photoresist film 21b below the light shielding portion 23a remains as it is, and the second photoresist film 21a below the semi-transmitting portion 21b is only partially developed and remains. Of the second photoresist film 21, the part exposed through the transmitting portion 23c is entirely removed.

Next, referring to FIG. 2C, the conductive layer 19, the ohmic contact layer (not shown), and the active layer 17 are sequentially etched by using the second photoresist patterns 21a and 21b as an etch mask to form active patterns 17a and 17b.

Subsequently, referring to FIGS. 2C and 2D, the portion of the conductive layer 19 disposed on the channel portion is exposed by ashing the second photoresist patterns 21a and 21b. In the ashing process, the second photoresist pattern 21a at the relatively thin region, that is, the channel region, is completely removed, to thus expose the portion of the conductive layer 19 thereunder. In addition, the a partial portion of the other second photoresist pattern 21b is removed to remain a predetermined thickness. That is, the ashing process is a process to oxidize and remove a photoresist film, which is an organic material. By this process, part of the second photoresist patterns is removed by oxidation, to thus remove the entire second photoresist pattern 21a and a partial portion of the second photoresist pattern 21b to a predetermined thickness.

Next, referring to FIG. 2E, the conductive layer 19 at the channel region and the ohmic contact layer are removed by using the ashed second photoresist pattern 21b as an etch mask, to form a source electrode 19a and a drain electrode 19b. At this stage, since the ashed second photoresist pattern 21b also exposes the peripheral regions of the active patterns 17a and 17b, the ohmic contact layer (not shown) and the conductive layer 19 formed on the peripheries of the active patterns 17a and 17b are removed. As a result, the active patterns 17a and 17b are protruded as compared to the source and drain electrodes 19a and 19b, and the data line 19. Therefore, a gap with a width of "D1" is formed between the active pattern 17b and a common electrode 13b.

Subsequently, referring to FIG. 2F, the ashed second photoresist pattern 21b is removed, and then a passivation layer 23 is formed on the first substrate 11 including the source and drain electrodes 19a and 19b, and a third photoresist film 25 is coated thereon.

Next, referring to FIG. 2G, the third photoresist film 25 is selectively removed by a photolithography process including exposure and development processes using a third mask, to form a third photoresist pattern 25a exposing part of the drain electrode 19b.

Subsequently, the passivation layer 23 is selectively etched by using the third photoresist pattern 25a as a mask, to form a contact hole 27 exposing the drain electrode 19b.

Next, referring to FIG. 2H, after removing the third photoresist pattern 25a, a transparent material, made of ITO or other transparent substance, connected to the drain electrode 19b is deposited on the passivation layer 23 including the contact hole 27.

Subsequently, a fourth photoresist film (not shown) is coated on the transparent material layer, and selectively removed by a photolithography process including exposure and development processes using a fourth mask, to form a fourth photoresist pattern (not shown).

Next, the transparent material layer (not shown) is selectively removed using the fourth photoresist pattern (not shown) as a mask, to form a pixel electrode 29 and then remove the fourth photoresist pattern.

Subsequently, referring to FIG. 2I, a black matrix 43 and a color filter layer 45 are sequentially deposited on a second substrate 41, and then an overcoat layer is formed on the color filter layer 45, or a common electrode 47 is formed thereon according to the alignment mode.

Next, the second substrate 41 and the first substrate 11 are bonded together, and then a liquid crystal layer 51 is formed between the second substrate 41 and the first substrate 11, thus completing the fabrication of the liquid crystal display device.

The thin film transistor fabricated in the order of the processes as described above is manufactured by a four mask process, including a first mask process in the formation of a gate electrode, a second mask process in the formation of an active pattern and source/drain electrodes, a third mask in the formation of a contact hole exposing the drain electrode, and a fourth mask process in the formation of a pixel electrode.

However, in a case where a diffraction exposure is carried out in order to simultaneously pattern the source/drain electrodes and the active layer, as shown in FIG. 2E, the active pattern may be formed wider than the line width of the source/drain electrodes, and this protruded portion may cause signal distortion. In particular, when a burst inverter method is used, the photocurrent of the active layer is formed when the burst inverter is performed at a predetermined cycle, and the photocurrent causes an interference effect with the metal (outermost common electrode) of adjacent portions, thus causing the signal distortion.

SUMMARY OF THE INVENTION

The present invention has been made in an effort to solve the aforementioned problems in the conventional art, and has for its object to provide a method for fabricating a liquid crystal display device, which can prevent signal distortion by reducing the interference effect between an active layer and a common electrode.

It is another object of the present invention to provide a method for fabricating a liquid crystal display device, which can reduce the number of mask processes.

To accomplish the above objects, there is provided a method for fabricating a liquid crystal display device in accordance with one aspect of the present invention, including the steps of: forming a gate line and a data line on a first substrate crossing each other to define a pixel region; forming a gate electrode, a source electrode and a drain electrode of a transistor on the first substrate; forming an active layer below the data line and between the gate electrode and each of the source electrode and the drain electrode, wherein the active layer below the data line has an exposed portion exposed by the data line; removing the exposed portion of the active layer below the data line; and forming a pixel electrode connected to the drain electrode.

To accomplish the above objects, there is provided a method for fabricating a portion of a liquid crystal display device in accordance with another aspect of the present invention, including the steps of: forming an active layer on a first substrate; forming a data line above the active layer, wherein the active layer below the data line has an exposed portion exposed by the data line; forming a passivation layer on the first substrate covering the data line and the active layer; forming a first opening in the passivation layer to expose the data line and the exposed portion of the active layer; and removing the exposed portion of the active layer below the data line using the data line as a mask.

To accomplish the above objects, there is provided a liquid crystal display device in accordance with another aspect of the present invention, including: a first substrate; a gate line and a data line on the first substrate crossing each other to define a pixel region on the first substrate; a transistor on the first substrate, the transistor including a gate electrode, a source electrode, a drain electrode, and a first active layer between the gate electrode and each of the source electrode and the drain electrode; a common electrode in the pixel region on the first substrate; a second active layer below the data line, a horizontal distance between the common electrode and the data line is substantially the same as a horizontal distance between the common electrode and the second active layer; a pixel electrode on the first substrate and connected to the drain electrode, a second substrate attached to the first substrate; and a liquid crystal layer between the second substrate and the first substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Hereinafter, a method for fabricating a liquid crystal display device in accordance with embodiments of the present invention will be described with reference to the accompanying drawings.

Figure 3:
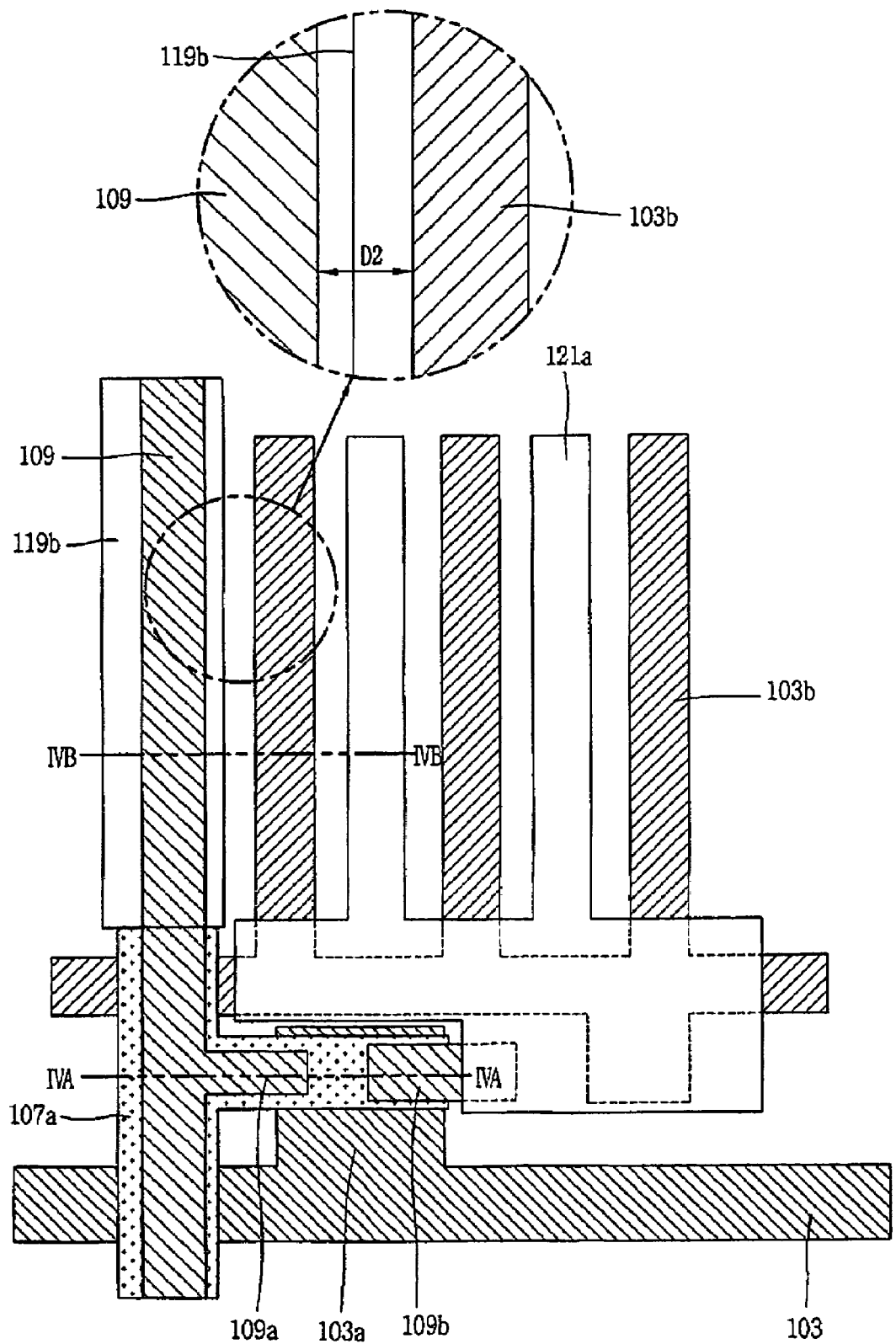
FIG. 3 is a plane view showing a unit pixel structure of a liquid crystal display device in accordance with one embodiment of the present invention.

FIG. 3 is a plane view showing a unit pixel structure of a liquid crystal display device in accordance with an embodiment of the present invention.

Referring to FIG. 3, in the liquid crystal display device in the illustrated embodiment, each pixel of the TFT LCD device where N×M pixels are arranged horizontally and vertically includes a TFT (not shown) formed at the crossing of a gate line 103 to which a scan signal is applied from an external driving circuit and a data line 109 to which an image signal is applied.

The TFT (not shown) includes a gate electrode 103a connected to the gate line 103, an active layer 107 formed on the gate electrode 103 and activated as a scan signal is applied to the gate electrode 103a, and source/drain electrodes 109a and 109b formed on the active layer 107.

A pixel electrode 209 is formed at a display region of the pixel. The pixel electrode 121a is connected to the drain electrodes 109b and operates the liquid crystal (not shown) by receiving an image signal through the drain electrode 109b as the active layer 107 is activated.

A method for fabricating the liquid crystal display device thus constructed in accordance with an embodiment of the present invention will be described with reference to FIGS. 4A to 4K.

FIGS. 4A to 4K are sectional views showing a process for fabricating a liquid crystal display device in accordance with one embodiment of the present invention, taken along lines IIA-IIA and IIB-IIB of FIG. 3.

Figure 4A:
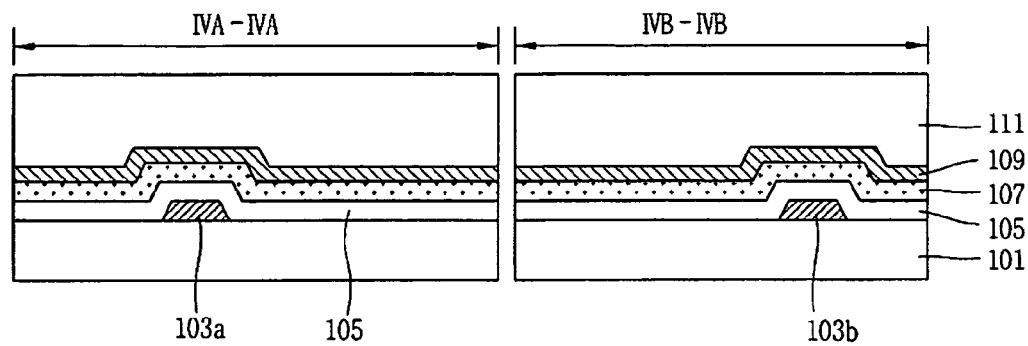
FIGS. 4A to 4K are sectional views showing a process for fabricating a liquid crystal display device in accordance with one embodiment of the present invention, taken along lines IIA-IIA and IIB-IIB of FIG. 3.

Referring to FIG. 4A, a metal layer (not shown) is formed on a first substrate 101 and a first photoresist film (not shown) is coated on the deposited metal layer. Then, a photolithography process including exposure and development processes using a first mask (not shown) is carried out to remove part of the first photoresist film and form a first photoresist pattern (not shown). Subsequently, part of the metal layer is removed using the first photoresist pattern as a mask to form a gate line (not shown; 103 of FIG. 3) and a gate electrode 103a extending from the gate line.

Next, after removing the first photoresist pattern, a gate insulating layer 105, an active layer 107, an ohmic contact layer (not shown), and a conductive layer 109 are sequentially formed on the entire surface of the first substrate 101 where the gate electrode 103a is formed.

Figure 4B:
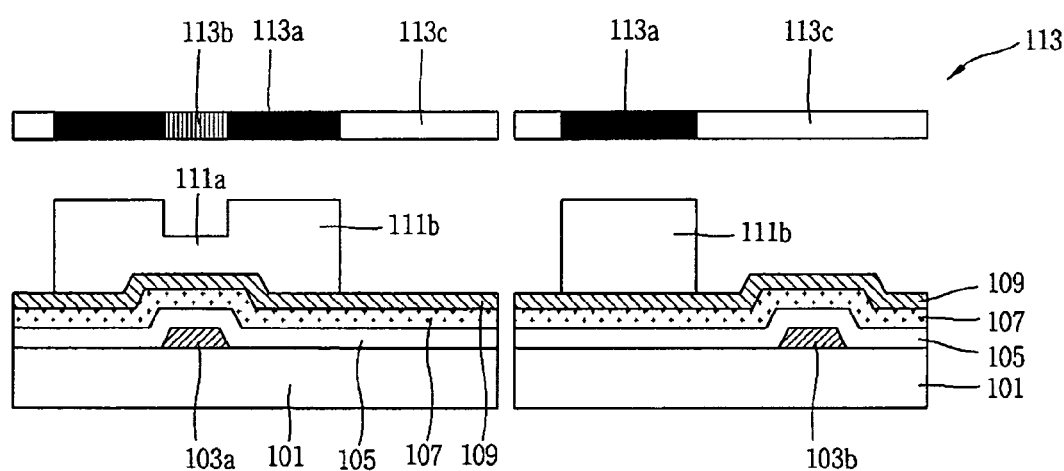

Subsequently, referring to FIG. 4B, a second photoresist film 111 is coated on the conductive layer 109, and then the second photoresist pattern 111 is selectively removed through a photolithography process including diffractive exposure and development processes using a second mask 113, which is a diffraction mask, thereby forming second photoresist patterns 111a and 111b. At this stage, the second mask 113 serving as the diffraction mask includes a light shielding portion 113a, a semi-transmitting portion 113b, and a transmitting portion 113c. The light shielding portion 113a is disposed at a top portion of the second photoresist film 111 corresponding to the source/drain regions, the semi-transmitting portion 113b is disposed at a position above the second photoresist film 111 corresponding to the channel region, and the transmitting portion 113c is disposed at a top portion of the second photoresist film 111 corresponding to the regions except the above regions.

Therefore, the portion of the second photoresist pattern 111a, patterned by a development process by ultraviolet rays irradiated through the semi-transmitting portion 113b of the second mask 113 serving as the diffraction mask has a photoresist film thickness smaller than the portion of the second photoresist pattern 111b disposed on the upper end of the channel region of the active layer 107. Therefore, although part of the ultraviolet rays is irradiated to the second photoresist 111 through the semi-transmitting portion 113b, the light is blocked by the light shielding portion 113a. Accordingly, the portion of the second photoresist film 111b below the light shielding portion 113a remains as it is, and the second photoresist film 111a below the semi-transmitting portion 111b is only partially developed and remains. Of the second photoresist film 111, the portion to which ultraviolet rays are irradiated through the transmitting portion 113c is entirely removed.

Figure 4C:
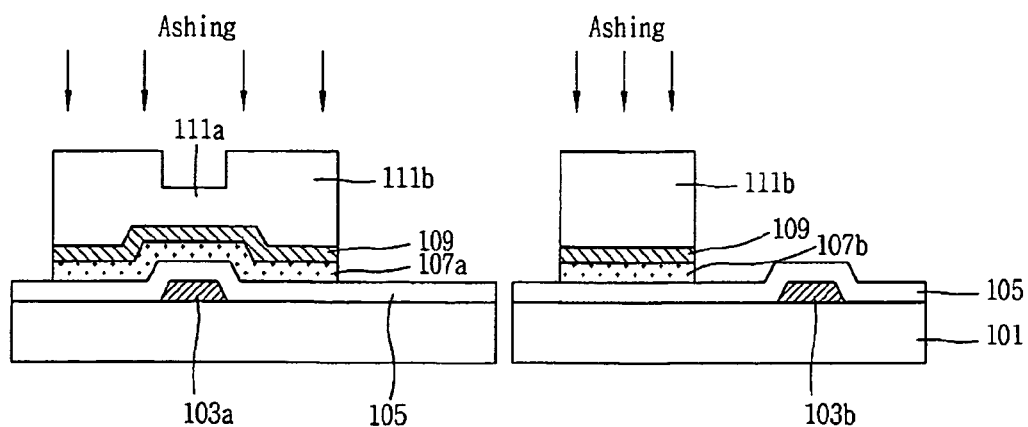

Next, referring to FIG. 4C, the conductive layer 109, the ohmic contact layer (not shown), and the active layer 107 are sequentially etched by using the second photoresist patterns 111a and 111b as an etch mask to form active patterns 107a and 107b.

Figure 4D:
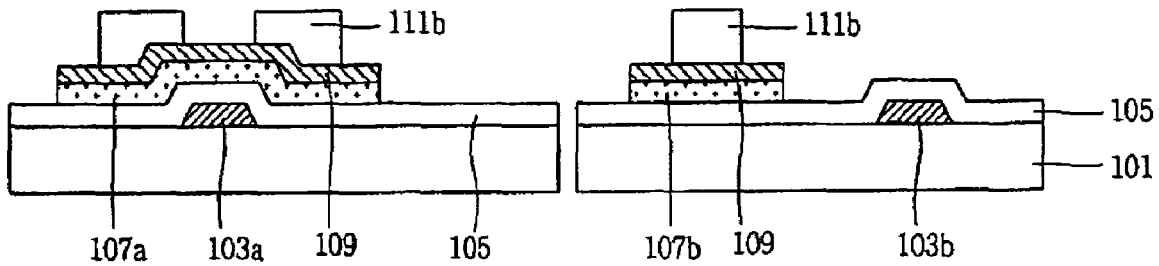

Subsequently, referring to FIGS. 4C and 4D, the portion of the conductive layer 109 disposed on the channel portion is exposed by ashing the second photoresist patterns 111a and 111b. In the ashing process, the second photoresist pattern 111a at the relatively thin region, that is, the channel region, is completely removed, to thus expose the portion of the conductive layer 109 thereunder. A partial portion of the other second photoresist pattern 111b is removed to remain a predetermined thickness. That is, the ashing process is a process to oxidize and remove a photoresist film, which is an organic material. By this process, part of the second photoresist patterns 111a and 111b is removed by oxidation, to thus remove the substantially entire second photoresist pattern 111a and partially remove the second photoresist pattern 111b to a predetermined thickness.

Figure 4E:
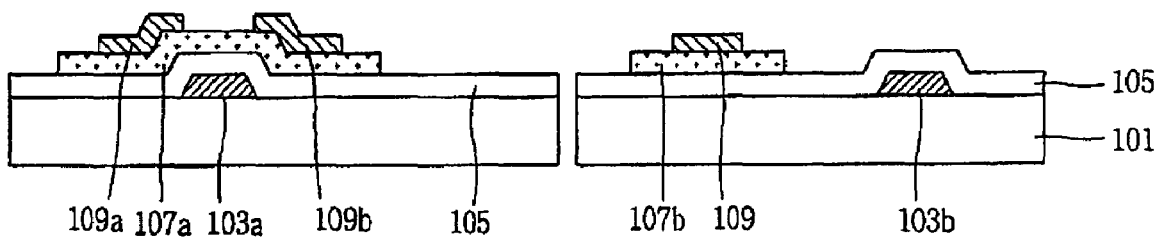

Next, referring to FIG. 4E, the conductive layer 109 at the channel region and the ohmic contact layer are removed by using the ashed second photoresist pattern 111b as an etch mask, to form a source electrode 109a and a drain electrode 109b. At this stage, since the ashed second photoresist pattern 111b also exposes the peripheral regions of the active patterns 107a and 107b, the ohmic contact layer (not shown) and the conductive layer 109 formed on the peripheries of the active patterns 107a and 107b are removed. As a result, the active patterns 107a and 107b are protruded as compared to the source and drain electrodes 109a and 109b and the data line 109.

Figure 4F:
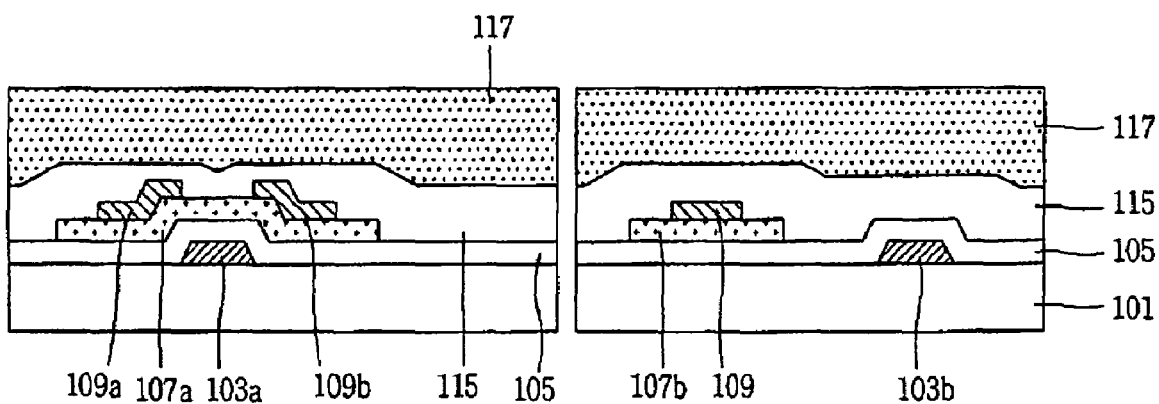

Subsequently, referring to FIG. 4F, the ashed second photoresist pattern 111b is removed, and then a passivation layer 115 is formed on the first substrate 111 including the source and drain electrodes 109a and 109b and the data line 109, and a third photoresist film 117 is coated thereon.

Figure 4G:
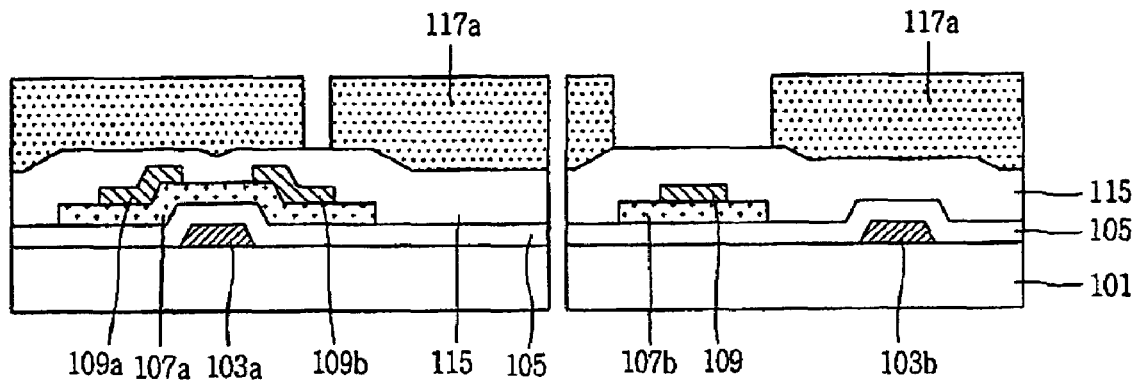

Next, referring to FIG. 4G, a photolithography process including exposure and development processes using a third mask is performed on the third photoresist film 117 to form a third photoresist pattern 117a exposing part of the drain electrode 109b. The third photoresist pattern 117a is formed in such a manner to expose the portion of the passivation layer 115 disposed on top of the data line 109 and the active pattern 107a under the data line 109 as well as the portion of the passivation layer 115 disposed on part of the drain electrode 109b.

Figure 1:
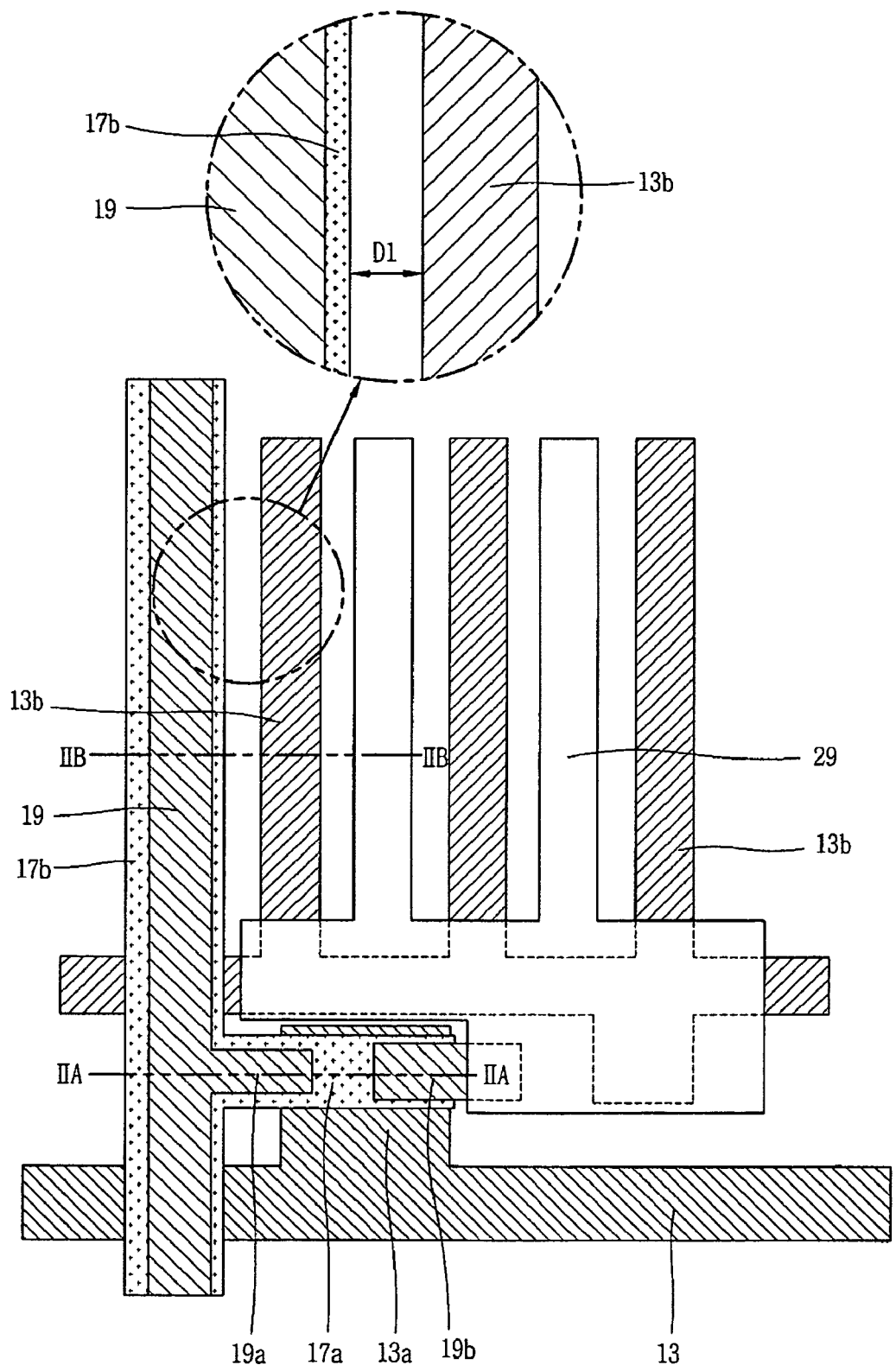
FIG. 1 is a plane view showing a unit pixel structure of a liquid crystal display device according to the related art.
Figure 2A:
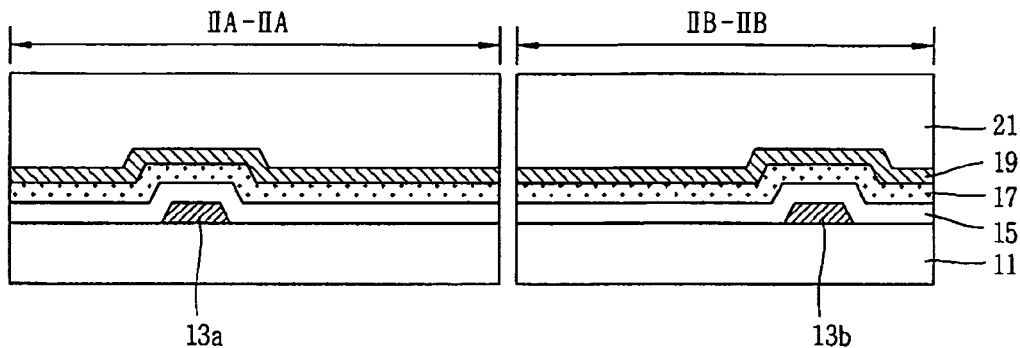
FIGS. 2A to 2I are sectional views showing a process for fabricating a liquid crystal display device according to the related art, taken along lines IIA-IIA and IIB-IIB of FIG. 1.
Figure 2B:
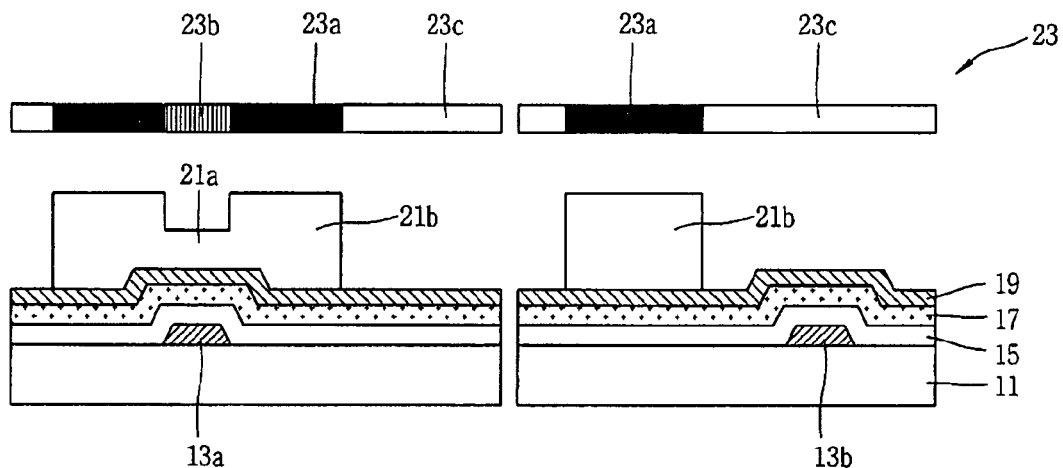
Figure 2C:
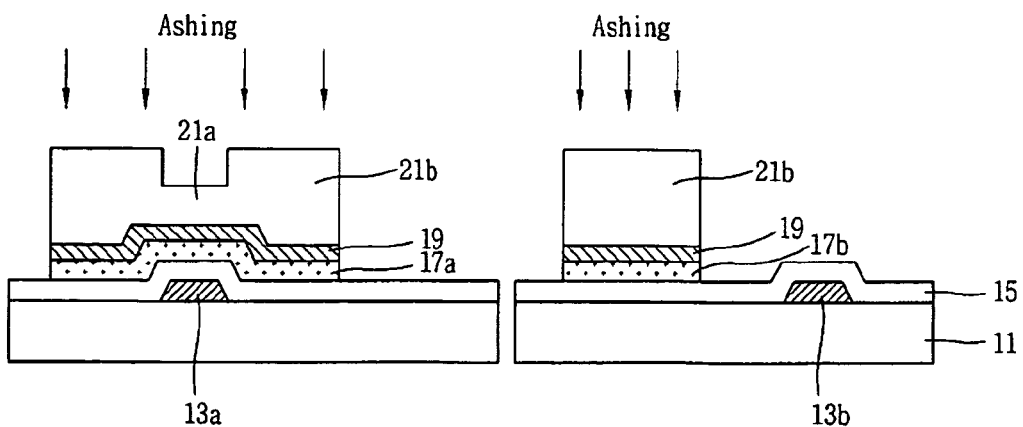
Figure 2D:
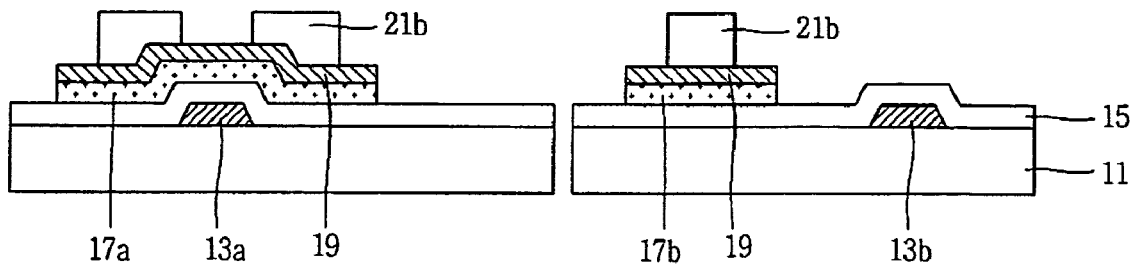
Figure 2E:
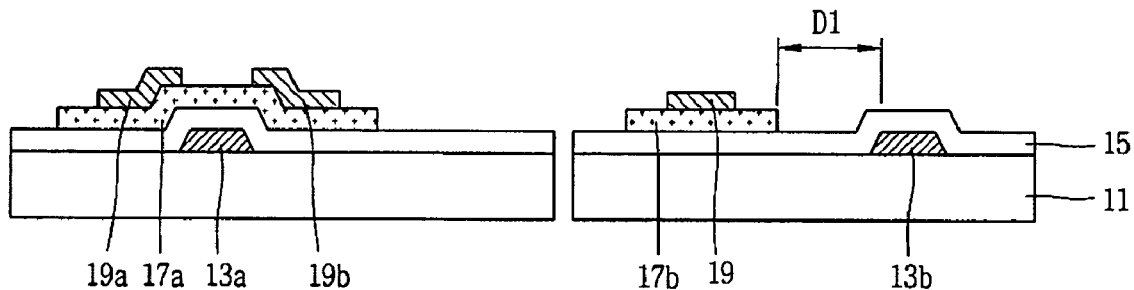
Figure 2F:
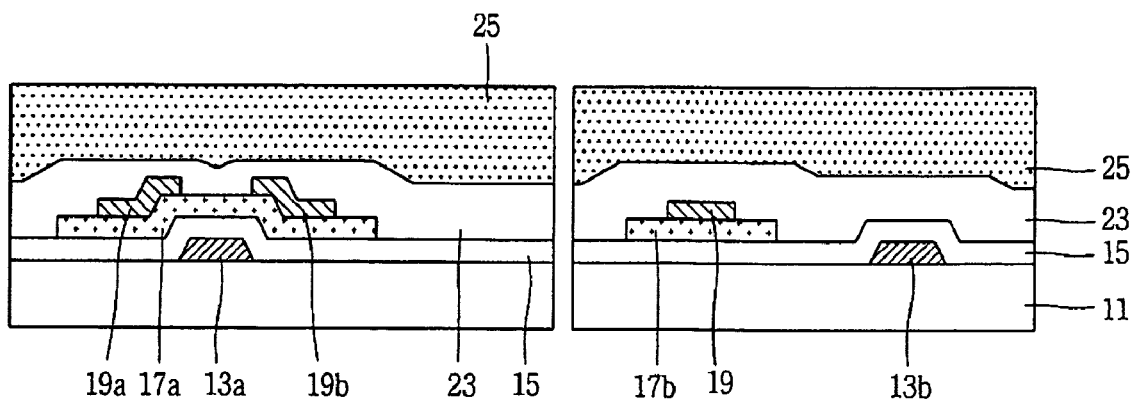
Figure 2G:
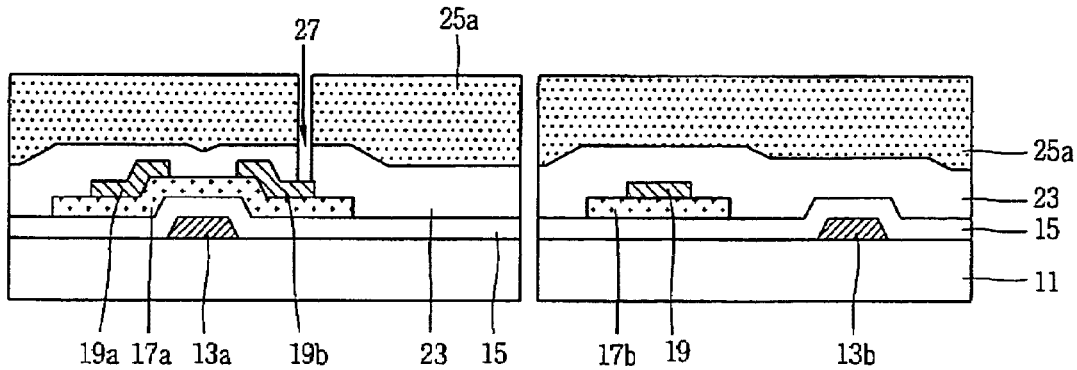
Figure 2H:
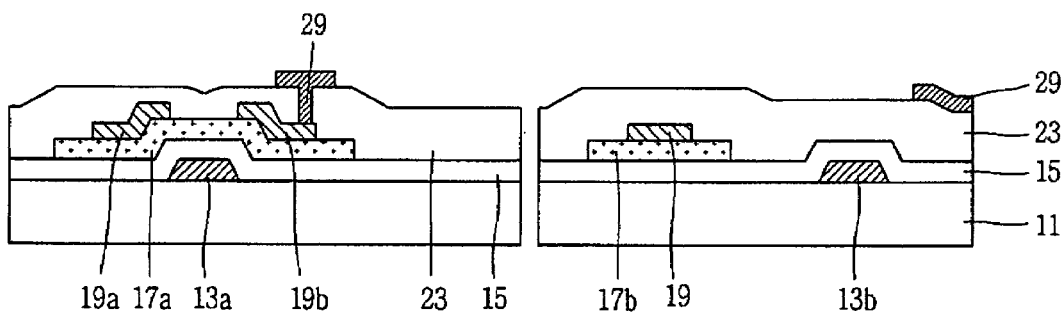
Figure 2I:
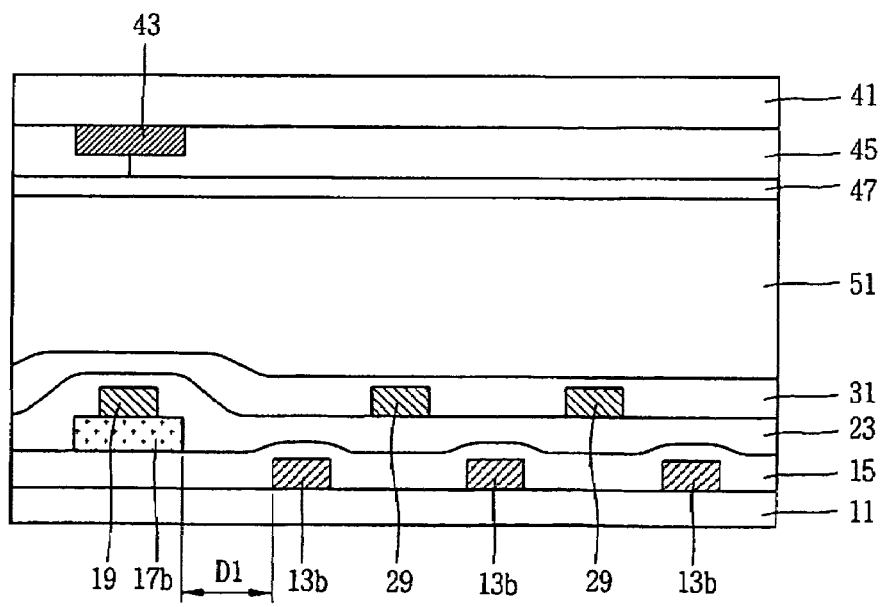
Figure 4H:
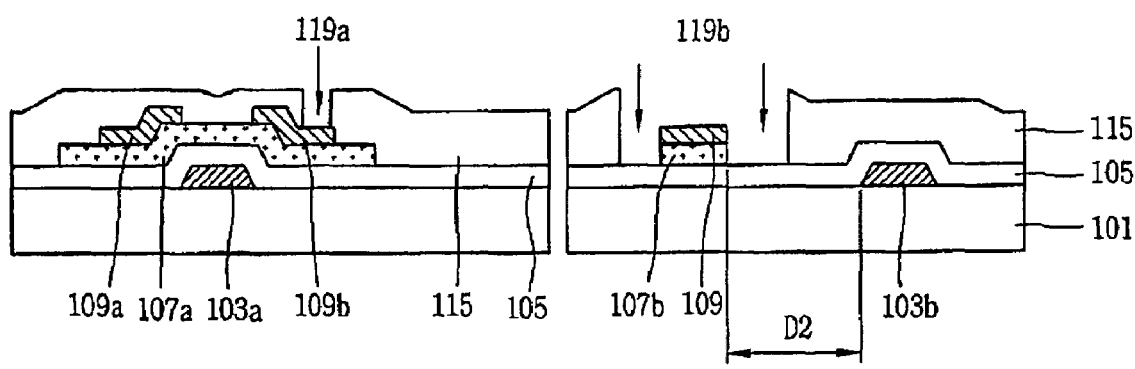

Subsequently, referring to FIG. 4H, the passivation layer 115 is selectively etched by using the third photoresist pattern 117a as a mask, to form a contact hole 119a exposing part of the drain electrode 109b. At the time of etching the passivation layer 115, the portion of the passivation layer 115 on the data line 109 and the protruded portion of the active pattern 107b thereunder are removed together to thus form one or more openings 119b. A gap with a width of "D2" is formed between the active pattern 107b and a common electrode 103b. That is, in the related art, the active pattern (17b of FIG. 2I) is protruded to the sides farther than the data line (19 of FIG. 2I). Therefore, the distance D1 between the active pattern 17b and the common electrode 13b is close. However, in the illustrated embodiment, the protruded portions of the active pattern 107b are removed as mentioned above. Therefore, the distance D2 between the active pattern 107b and the common electrode 103b becomes larger than the distance D1 in the related art.

Figure 4I:
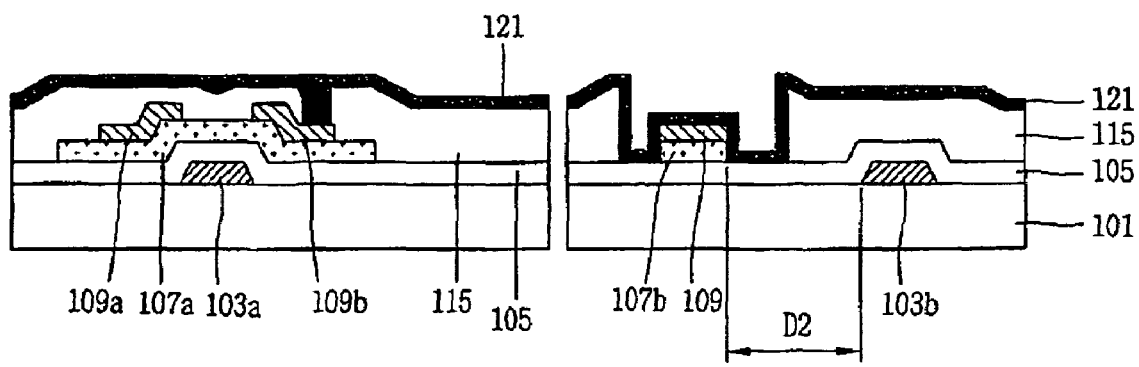

Next, referring to FIG. 4I, after removing the third photoresist pattern 117a, a transparent conductive layer 121, such as ITO or IZO, connected to the drain electrode 109b, is deposited on the passivation layer 115 including the contact hole 119a and the openings 119b.

Figure 4J:
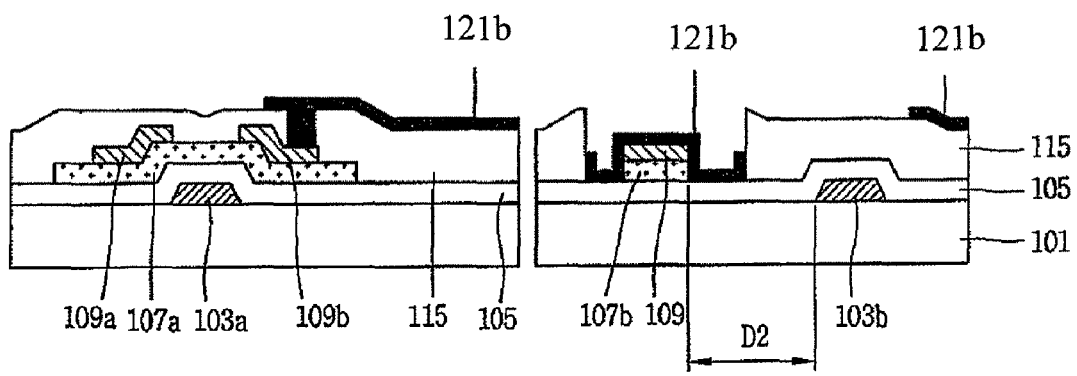

Subsequently, referring to FIG. 4J, a fourth photoresist film (not shown) is coated on the transparent conductive layer 121, and selectively removed by exposure and development processes using a fourth mask (not shown), to form a fourth photoresist pattern (not shown). Subsequently, the transparent conductive layer 121 is patterned by using the fourth photoresist pattern (not shown) as a mask to form a pixel electrode 121a and a conductive layer pattern 121b. The conductive layer pattern 121b is covered over the opening 119b including the data line 109 and the active layer 107b.

Next, the transparent material layer (not shown) is selectively removed using the fourth photoresist pattern (not shown) as a mask, to form the pixel electrode 121a and the conductive layer pattern 121b, and then remove the fourth photoresist pattern. As shown in FIG. 4J, a conductive or metal layer formed of the same material as the pixel electrode extends along the sidewall of the passivation layer 115 surrounding the opening 119b and in contact with the data line 109 and the active pattern 107b. In addition, the conductive or metal layer also extends along a lateral sidewall of the data line 109 and a lateral sidewall of the active pattern 107b.

Figure 4K:
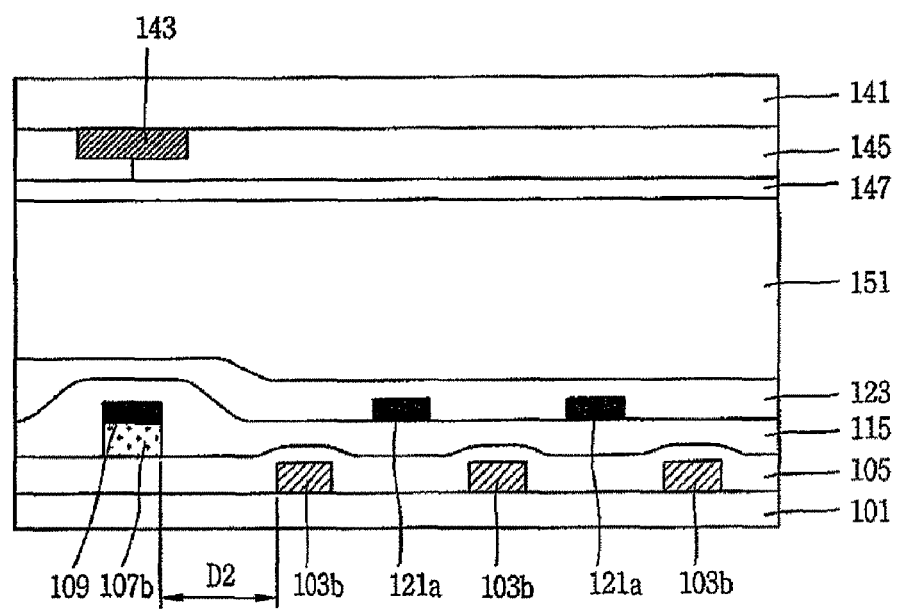

Subsequently, referring to FIG. 4K, a black matrix 143 and a color filter layer 145 are sequentially deposited on a second substrate 141, and then an overcoat layer or an alignment layer 147 is formed on the color filter layer 145 an alignment layer 123 is formed on the first substrate 101.

Next, the second substrate 141 and the first substrate 101 are bonded together, and then a liquid crystal layer 151 is formed between the second substrate 141 and the first substrate 101, thus completing the fabrication of the liquid crystal display device.

Meanwhile, a method for fabricating a liquid crystal display device in accordance with another embodiment of the present invention proposed to reduce the number of mask processes will be described below with reference to FIGS. 5A to 5F.

Since some steps of the fabrication process of a liquid crystal display device in accordance with another embodiment of the present invention are the same as those shown in FIGS. 4A to 4F of the fabrication process in accordance with one embodiment of the present invention, a description thereof will be omitted. That is, the process steps of forming a gate electrode 203a, a common electrode 203b, active patterns 207a and 207b, source/drain electrodes 209a and 209b, a data line 209, and a passivation layer 215, using a first mask and a second mask, will be omitted.

Figure 5A:
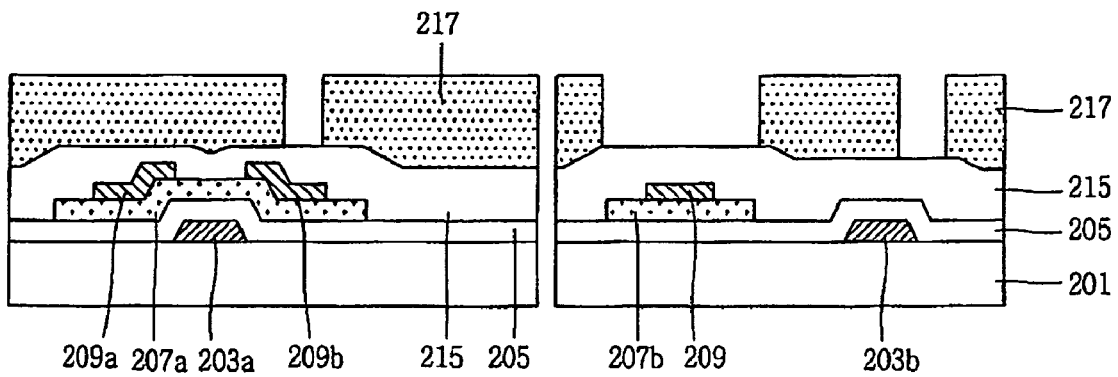
FIGS. 5A to 5F are sectional views showing a process for fabricating a liquid crystal display device in accordance with another embodiment of the present invention.

Referring to FIG. 5A, part of a third photoresist film (not shown) is selectively removed by exposure and development processes to form a third photoresist pattern 217 exposing part of a passivation layer 215b. The third photoresist pattern 217a is formed in such a manner to expose the portion of the passivation layer 215 disposed on top of the data line 209, the active pattern 207a thereunder and part of the common electrode 203b, as well as the portion of the passivation layer 215 disposed on part of the drain electrode 209b.

Figure 5B:
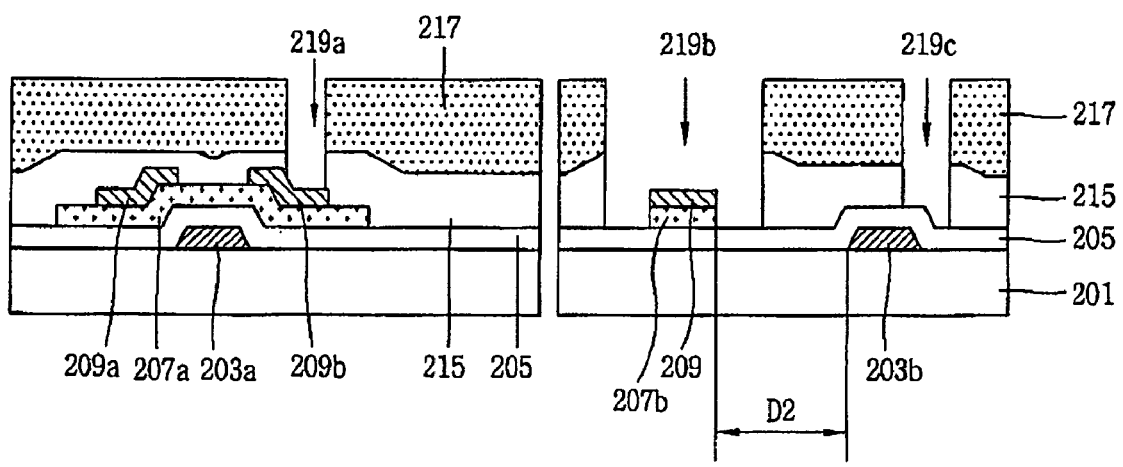

Subsequently, referring to FIG. 5B, the passivation layer 215 is selectively etched by using the third photoresist pattern 217a as a mask, to form a contact hole 219a exposing part of the drain electrode 209b, one or more openings 219b exposing the data line 209 and the active pattern 207b, and one or more openings 219c exposing the gate insulating layer 205. At the time of etching the passivation layer 215, the portion of the passivation layer 215 on the data line 209, the portion of the active pattern 207b thereunder, and the portion of the passivation layer 215 on top of the common electrode 203b are removed together to thus form openings 219b and 219c. A gap with a width of "D2" is formed between the active pattern 207b and the common electrode 203b. Accordingly, in the illustrated embodiment, the protruded portions of the active pattern 207b are removed as mentioned above. Therefore, the distance D2 between the active pattern 207b and the common electrode 203b becomes larger than the distance D1 in the related art.

Figure 5C:
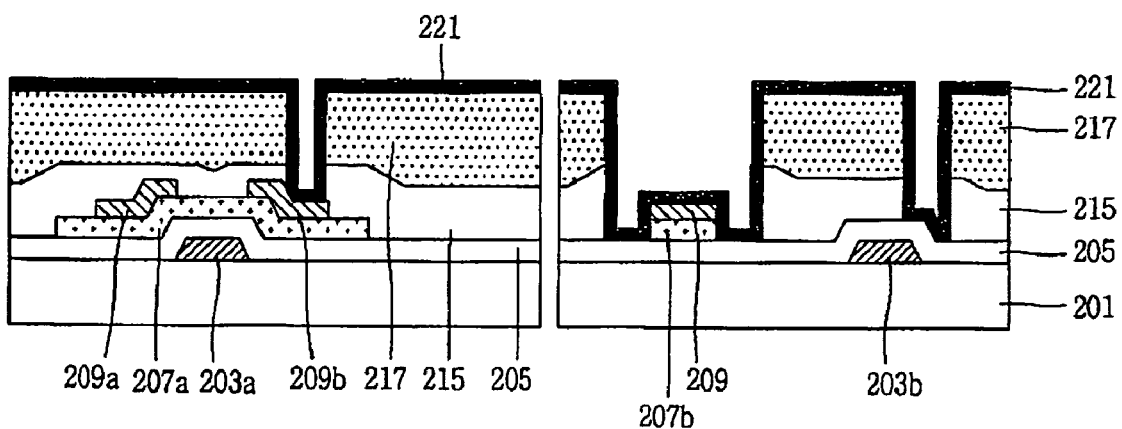

Next, referring to FIG. 5C, a transparent conductive material, such as ITO or IZO, is deposited on the entire surface of the substrate including the third photoresist pattern 217 by sputtering or deposition to form a transparent conductive layer 221.

Figure 5D:
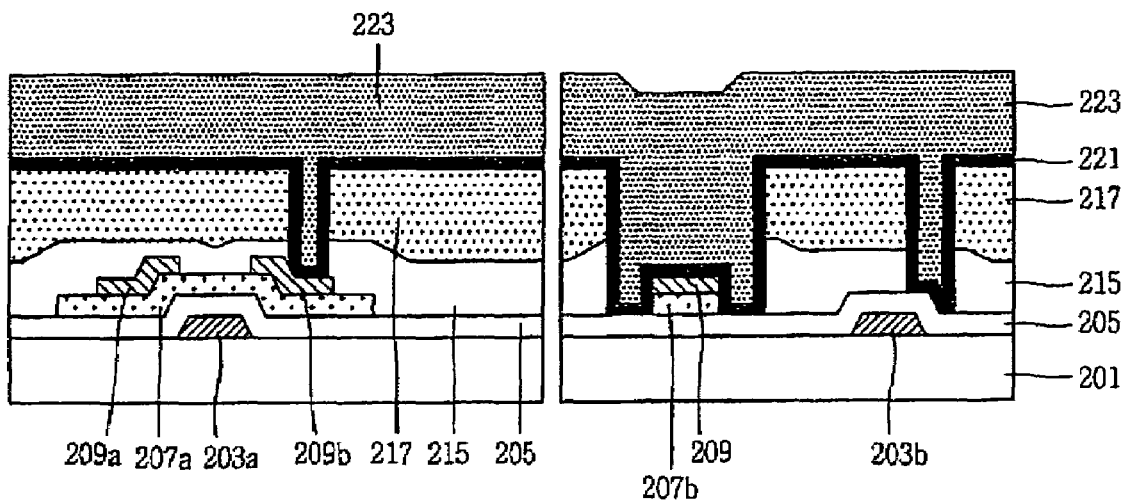

Subsequently, referring to FIG. 5D, a fourth photoresist film 223 is coated on the transparent conductive layer 221.

Figure 5E:
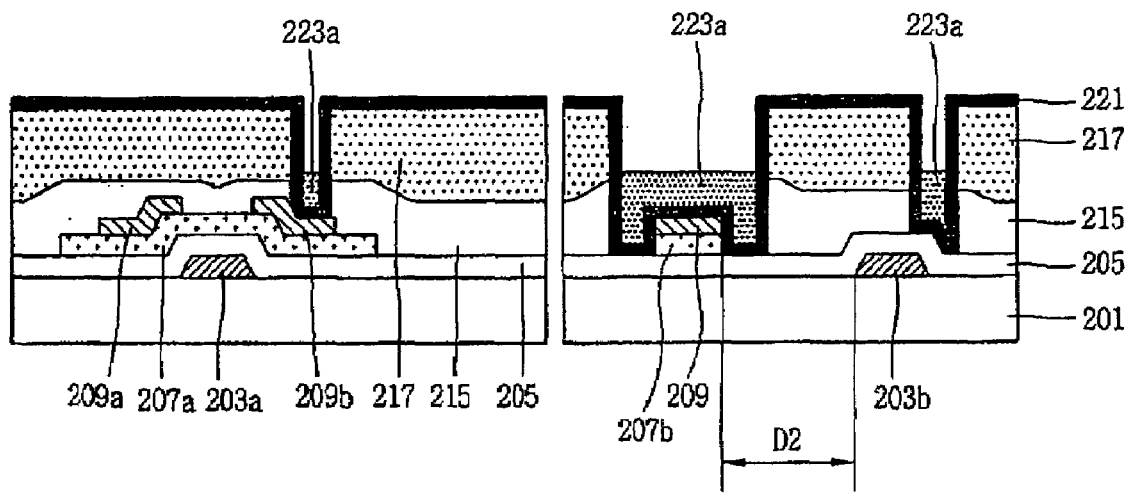

Next, referring to FIG. 5E, the fourth photoresist film 223 is removed to a predetermined thickness by an ashing process so as to expose part of the transparent conductive layer 221. In an embodiment, the portion of the second photoresist layer above the passivation layer is removed to expose part of the transparent conductive layer 221.

Figure 5F:
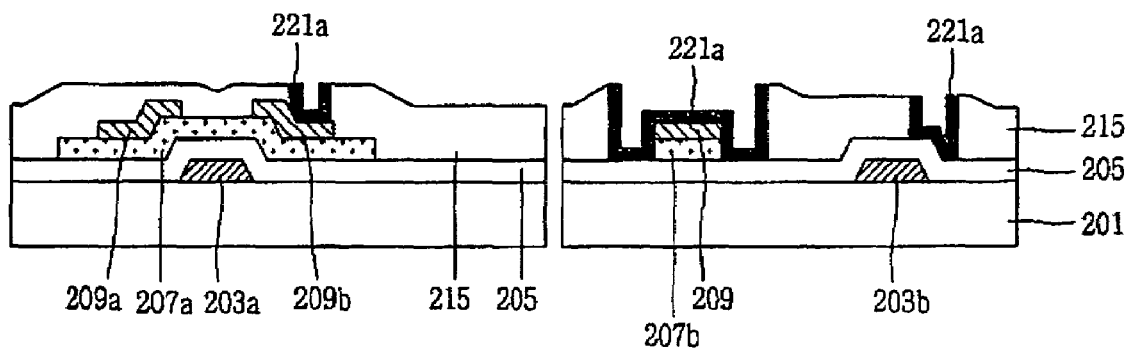

Subsequently, referring to FIG. 5F, the exposed portion of the transparent conductive layer 221 is removed, and then the residual portions of the fourth photoresist film 223 and third photoresist pattern 217 are completely removed to thus form a pixel electrode 221a electrically connect to the drain electrode 209b and having a finger shape as shown in FIG. 5F. In an embodiment, the conductive layer above the passivation layer is removed by removing the third photoresist layer 217. As a result, as shown in FIG. 5F, the pixel electrode includes a first portion in the contact hole 219a in contact with the drain electrode 209b, and a second portion along a sidewall of the passivation layer surrounding the opening 219c and in contact with the exposed gate insulating layer 205. In addition, a conductive or metal layer formed of the same material as the pixel electrode extends along a sidewall of the passivation layer 215 surrounding the opening 219b and is in contact with the data line 209 and the active pattern 207b. In addition, the conductive or metal layer also extends along a lateral sidewall of the data line 209 and a lateral sidewall of the active pattern 207b. As shown in FIG. 5F, a top surface of the passivation layer 215 is substantially free of the pixel electrode.

Accordingly, the devices on the first substrate of a liquid crystal display device is fabricated by using three masks, rather than using four masks as in the related art. In particular, the combination of the step of removing the exposed portion of the active pattern 207b and the step of forming the pixel electrode is performed by using a single mask.

Thereafter, though not shown, a black matrix and a color filter layer are sequentially deposited on the second substrate, and then an overcoat layer or an alignment layer is formed on the color filter layer.

Next, the second substrate and the first substrate are bonded together, and then a liquid crystal layer is formed between the second substrate and the first substrate, thus completing the fabrication of the liquid crystal display device. Although an in-plane switching liquid crystal display device is illustrated in the embodiments, the present invention can also be applied to other liquid crystal display devices, such as a fringe field switching liquid crystal display device to prevent signal distortion. In an in-plane switching liquid crystal display device, the pixel electrode and the common electrode form an horizontal electric field to change the alignment direction of the liquid crystal material. In a fringe field switching liquid crystal display device, the pixel electrode and the common electrode form a fringe electric field to change the alignment direction of the liquid crystal material.

As described above, the fabrication method of a liquid crystal display device has the following effects.

According to the fabrication method of a liquid crystal display device of the illustrated embodiments, since the active layer protruding from the edge of the data line is removed at the time of formation of a contact hole, the distance between an active pattern and a common electrode becomes larger than the distance in the related art, thereby preventing signal distortion.

Furthermore, according to an embodiment of the present invention, the number of masks can be reduced because the combination of the step of removing the exposed portion of the active pattern 207b and the step of forming the pixel electrode is performed by using a single mask.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for fabricating a liquid crystal display device, comprising:
    forming a gate line and a data line on a first substrate crossing each other to define a pixel region;
    forming a common electrode in the pixel region on the first substrate;
    forming a gate electrode, a source electrode and a drain electrode of a transistor on the first substrate;
    forming an active layer below the data line, and between the gate electrode and each of the source electrode and the drain electrode, wherein the active layer below the data line has a protruded portion protruded from the data line;
    forming a passivation layer on an entire surface of the first substrate;
    removing the passivation layer and the protruded portion of the active layer to form first and second openings exposing the drain electrode and the data line within the second opening of the passivation layer, respectively, wherein the first opening exposes the drain electrode, and the second opening exposes the data line and the active layer below the data line and the protruded portion of the active layer is removed using the data line as a mask; and
    forming a pixel electrode connected to the drain electrode through the first opening, and a conductive layer pattern within the second opening to cover the data line and the active layer below the data line.

2. The method of claim 1, wherein a horizontal distance between the common electrode and the data line is substantially the same as a horizontal distance between the common electrode and the active layer below the data line after the protruded portion of the active layer is removed.

3. The method of claim 2, wherein the step of removing the passivation layer and the protruded portion of the active layer to expose the drain electrode and the data line includes removing the protruded portion of the active layer such that the remaining active layer below the data line and the data line are aligned to have a substantially same width.

4. The method of claim 1, wherein the step of forming the pixel electrode is performed by using a single mask, the step of forming the pixel electrode performed by using the single mask including:
    forming a passivation layer covering the first substrate;
    forming a first photoresist layer on the passivation layer;
    patterning the first photoresist layer and the passivation layer, using the single mask, to form a plurality of openings;
    forming a conductive layer covering the first photoresist layer and entering into the plurality of openings;
    forming a second photoresist layer covering the conductive layer;
    partially removing the second photoresist layer to expose a portion of the conductive layer; and
    removing the exposed portion of the conductive layer such that the remaining conductive layer is the pixel electrode.

5. The method of claim 4, further comprising forming a common electrode in the pixel region, wherein the step of forming the plurality of openings includes forming a contact hole exposing the drain electrode, and a first opening exposing the pixel region adjacent to the common electrode.

6. The method of claim 5, wherein the step of forming the plurality of openings further includes forming a second opening exposing the data line and the exposed portion of the active layer, and the step of removing the exposed portion of the active layer below the data line includes removing the exposed portion of the active layer using the data line as a mask.

7. The method of claim 5, further comprising forming a gate insulating layer on first substrate covering the gate electrode and the pixel region, wherein the first opening exposes the gate insulating layer, and the step of forming the conductive layer includes filling the conductive layer into the first opening to be in contact with the exposed gate insulating layer.

8. The method of claim 5, wherein the step of partially removing the second photoresist layer to expose the exposed portion of the conductive layer includes performing an ashing process to remove the second photoresist layer above the passivation layer, and wherein the step of removing the exposed portion of the conductive layer includes removing the conductive layer above the passivation layer by removing the first photoresist layer.

9. The method of claim 8, wherein the step of removing the conductive layer above the passivation layer includes keeping the conductive layer along a sidewall of the passivation layer surrounding the first opening from being removed such that the conductive layer along the sidewall of the passivation layer surrounding the first opening is a portion of the pixel electrode.

10. The method of claim 1, further comprising
forming a first photoresist layer on the passivation layer;
patterning the first photoresist layer to form a first photoresist layer pattern;
removing the passivation layer and the protruded portion of the active layer using the first photoresist layer pattern as a mask to form a contact hole exposing the drain electrode and to form an opening exposing the data line, wherein a width of the data line is the same as that of the active layer below the data line;
removing the first photoresist layer pattern;
forming a conductive layer covering the passivation layer and entering into the contact hole and the opening;
forming a second photoresist layer covering the conductive layer and entering into the contact hole and the opening;
patterning the second photoresist layer to form a second photoresist layer pattern;
removing the conductive layer using the second photoresist layer pattern as a mask to form the pixel electrode and the conductive layer pattern; and
removing the second photoresist layer pattern.

11. The method of claim 1, further comprising:
forming a liquid crystal layer between a second substrate and the first substrate.

12. A liquid crystal display device comprising:
a first substrate;
a gate line and a data line on the first substrate crossing each other to define a pixel region on the first substrate;
a transistor on the first substrate, the transistor including a gate electrode, a source electrode, a drain electrode, and a first active layer between the gate electrode and each of the source electrode and the drain electrode;
a common electrode in the pixel region on the first substrate;
a second active layer below the data line, a horizontal distance between the common electrode and the data line is substantially the same as a horizontal distance between the common electrode and the second active layer;
a passivation layer on the first substrate, the passivation layer having a contact hole exposing the drain electrode and an opening exposing the data line and the second active layer, wherein a width of the data line is the same as that of the second active layer below the data line;
a pixel electrode on the first substrate and connected to the drain electrode through the contact hole;
a conductive layer pattern formed within the opening to cover the data line and the second active layer below the data line;
a second substrate attached to the first substrate; and
a liquid crystal layer between the second substrate and the first substrate.

13. The device of claim 12, wherein the first and second active layers are made of a same material.

14. The device of claim 12, wherein the conductive layer pattern and the pixel electrode are made of a same material.

15. The device of claim 12, wherein the conductive layer pattern is along a lateral sidewall and an upper side of the data line and a lateral sidewall of the second active layer.

16. The device of claim 12, wherein the liquid crystal display device is an in-plane switching liquid crystal display device.

17. The device of claim 12, wherein the pixel electrode and the common electrode form a horizontal electric field.

18. The device of claim 12, wherein the liquid crystal display device is a fringe field switching liquid crystal display device.

19. A method for fabricating a portion of a liquid crystal display device, comprising:
forming an active layer on a first substrate;
forming a source electrode, a drain electrode and a data line above the active layer, wherein the active layer below the data line has a protruded portion protruded from the data line;
forming a passivation layer on the first substrate covering the data line and the active layer;
removing the passivation layer and the protruded portion of the active layer to form a contact hole exposing the drain electrode and an opening exposing the data line and a side of the active layer;
forming a common electrode in a pixel region on the first substrate, wherein a horizontal distance between the common electrode and the data line is substantially the same as a horizontal distance between the common electrode and the active layer below the data line after the protruded portion of the active layer is removed; and
forming a pixel electrode connected to the drain electrode of a transistor of the liquid crystal display device, and a conductive layer pattern covering the data line and the active layer within the opening of the passivation layer.

20. The method of claim 19, wherein the combination of the step of forming the passivation layer, the step of forming the opening, the step of removing the protruded portion of the active layer, and the step of forming the pixel electrode performed by using a single mask includes:
forming the passivation layer covering the first substrate;
forming a first photoresist layer on the passivation layer;
patterning the first photoresist layer and the passivation layer, using the single mask, to form a first opening exposing the data line and the protruded portion of the active layer, a contact hole exposing the drain electrode, and a second opening exposing a pixel region on the first substrate;
removing the protruded portion of the active layer using the data line as a mask;
forming a conductive layer covering the first photoresist layer and entering into the contact hole, the first opening and the second opening;
forming a second photoresist layer covering the conductive layer and entering into the contact hole, the first opening and the second opening;
performing an ashing process to remove the second photoresist layer above the passivation layer; and
removing the conductive layer above the passivation layer by removing the first photoresist layer.

21. The method of claim 20, further comprising forming a gate insulating layer on first substrate covering the gate electrode and the pixel region, wherein the second opening exposes the gate insulating layer, and the step of forming the conductive layer includes filling the conductive layer into the second opening to be in contact with the exposed gate insulating layer.

22. The method of claim 20, wherein the step of removing the conductive layer above the passivation layer includes keeping the conductive layer along a sidewall of the passivation layer surrounding the contact hole and the second opening from being removed such that the conductive layer along the sidewall of the passivation layer surrounding the contact hole and the second opening is the pixel electrode.

* * * * *